(12) United States Patent
Terashima

(10) Patent No.: US 7,742,247 B2
(45) Date of Patent: Jun. 22, 2010

(54) LENS CONTROL APPARATUS

(75) Inventor: Masayuki Terashima, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/240,870

(22) Filed: Sep. 29, 2008

(65) Prior Publication Data

US 2009/0097133 A1    Apr. 16, 2009

(30) Foreign Application Priority Data

Oct. 12, 2007   (JP)   ............................ P2007-266568

(51) Int. Cl.
*G02B 7/02* (2006.01)
(52) U.S. Cl. ...................................................... 359/819
(58) Field of Classification Search .................. 359/819
See application file for complete search history.

(56) References Cited

U.S. PATENT DOCUMENTS 6,526,232 B1   2/2003   Mizumura 7,092,027 B1 *   8/2006   Mizumura .................. 348/345
2004/0165879 A1   8/2004   Sasaki et al.

FOREIGN PATENT DOCUMENTS

| EP | 1 081 524 A2 | 3/2001 |
| JP | 2001-160912 A | 6/2001 |
| JP | 2005-130255 A | 5/2005 |
| JP | 2006-30680 A | 2/2006 |

* cited by examiner

*Primary Examiner*—Jordan M. Schwartz
*Assistant Examiner*—James C Jones
(74) *Attorney, Agent, or Firm*—Birch, Stewart, Kolasch & Birch, LLP

(57) ABSTRACT

A lens control apparatus for controlling a lens apparatus having an extender is provided. When an operation of storing a shot is performed in a shot box connected to the lens apparatus having an extender, a memory stores data including a position of a zoom lens group at that time, a position of a focus lens group at that time, and a magnification of the extender at that time. When an operation of reproducing the shot is performed, a CPU transmits a control signal for moving the zoom lens group and the focus lens group to positions represented by the shot. In addition, the CPU transmits to the lens apparatus a control signal for setting the magnification of the extender at a value of the magnification thereof represented by the stored shot.

2 Claims, 3 Drawing Sheets

LENS CONTROL APPARATUS

This application is based on and claims priority under 35 U.S.C §119 from Japanese Patent Application No. 2007-266568, filed on Oct. 12, 2007, the entire disclosure of which is herein incorporated by reference.

BACKGROUND OF THE INVENTION

1. Field of the Invention

The present invention relates to a lens control apparatus and, more particularly, to a lens control apparatus having a shot function of preliminarily storing data including a set state of controlled objects, such as zoom and focus, of a lens apparatus as data called a "shot" and of reproducing the shot by a shot reproduction operation.

2. Description of Related Art

An apparatus called "a shot box", in which a shot function (preset function) is installed, is known as a lens control apparatus for controlling a lens device for use in a television camera for broadcast-use or business-use (see, e.g., JP-A-2001-160912 and JP-A-2005-130255). The shot function serves to preliminarily store data including set states (corresponding to set positions) of zoom (e.g., a zoom lens group) and focus (e.g., a focus lens group) as a shot and to thereby enable automatic reproduction of the set states of the zoom and the focus, which are stored as the shot, by performing a turn-on operation of a shot switch provided in the shot box.

Incidentally, zoom of the lens apparatus is a control object of the lens apparatus, which is controlled by moving a movable zoom lens group for continuously varying a focal length of a shooting optical system. Aside from this, an apparatus provided with an extender for converting a focal length by a magnification is known. The magnification of the extender is set such that the focal length can be changed between values obtained by a plurality of magnifications, e.g., from a value equal to an initial value to a value twice the initial value and vice versa by, e.g., changing the type of a lens group (extender lens group) to be inserted into a shooting optical system.

However, a shot box in the related art neither stores nor reproduces information concerning an extender magnification (magnification of a focal length to be converted by an extender lens group inserted into a shooting optical system) as a controlled object of the shot function. Thus, sometimes, the extender magnification at storing of a shot differs from that at reproducing of the shot. In this case, an inconvenience occurs, in which the focal length (shooting angle of view) at reproducing of a shot differs from that at storing of the shot.

SUMMARY OF THE INVENTION

An object of an illustrative, non-limiting embodiment of the invention is to provide a lens control apparatus having a shot function for a lens apparatus having an extender, which reliably reproduces a shooting angle of view at storing a shot.

According to an aspect of the invention, there is provided a lens control apparatus for controlling a lens apparatus that comprises a shooting optical system including: a zoom lens group adapted to continuously change a focal length of the shooting optical system; and an extender adapted to convert the focal length of the shooting optical system at a magnification and to be able to change the magnification for conversion. The lens control apparatus comprising a shot control section adapted to preliminarily store data including an intended position of the zoom lens group as a shot, and to move the zoom lens group to the position stored as the shot when a shot reproduction operation of instructing a shot reproduction is performed. The data stored as the shot further includes a intended set state of the extender, and when the shot reproduction operation is performed, the shot control section moves the zoom lens group to the position stored as the shot and sets the extender in the set state stored as the shot.

The lens control apparatus stores data including the set state of the extender, together with data including the position of the zoom lens group, as a shot when storing the shot. When the shot is reproduced, the set states of the extender together with the zoom lens group, which are stored as the shot. Thus, even in a case where the set state (the extender magnification) of the extender at the reproduction of the shot differs from that of the extender at the storage of the shot, the focal length (the shooting angle of view) at the storage of the shot can reliably be reproduced.

In the lens control apparatus, the shooting optical system may further include a focus lens group adapted to adjust a focus position of the shooting optical system, and the data stored as the shot further may include an intended position of the focus lens group, and when the shot reproduction operation is performed, the shot controls section may move the zoom lens group and the focus lens group to the respective positions stores as the shot.

This is an embodiment in which the position of the focus lens group can be stored together with the position of the zoom lens group and the set state of the extender, and in which the positions of the zoom lens group and the focus lens group and the set state of the extender can be reproduced.

In the lens control apparatus, the shooting optical system may further include a focus lens group adapted to adjust a focus position of the shooting optical system, the data stored as the shot further may include an intended position of the focus lens group. Further, the shot control section can perform control operations of at least two mode selected from the group consisting of: a zoom-and-focus reproduction mode in which when the shot reproduction operation is performed, the shot control section moves the zoom lens group and the focus lens group to the respected positions stored as the shot and sets the extender in the set state stored as the shot; a focus reproduction mode in which when the shot reproduction operation is performed, the shot control section moves only the focus lens group to the position stored as the shot; and a zoom reproduction mode in which when the shot reproduction operation is performed, the shot control section moves the zoom lens group to the position stored as the shot, sets the extender in the set state stored as the shot, and keeps the focus lens group at a position at a time when the shot reproduction operation is performed. When the shot reproduction operation is performed, the shot control section can perform a control operation of one mode selected by a selection section from the at least two modes.

In this embodiment, when storing a shot, the set states of the zoom lens group, the focus lens group and the extender as the shot are stored. When the shot is reproduced, the lens control apparatus can select one of at least two of the zoom-and-focus reproduction mode, the zoom reproduction mode, and the focus reproduction mode. In the zoom-and-focus reproduction mode, the shot concerning the zoom lens group, the focus lens group and the extender are reproduced. In the zoom reproduction mode, the shot concerning the zoom lens group and the extender are reproduced. In the focus reproduction mode, the shot concerning only the focus lens group are reproduced. In the focus reproduction mode, neither shot concerning only the zoom lens group nor the shot concerning the extender are reproduced. Consequently, a shooting angle of view can be maintained as it is.

BRIEF DESCRIPTION OF THE DRAWINGS

The features of the invention will appear more fully upon consideration of the exemplary example of the invention, which are schematically set forth in the drawings, in which.

DETAILED DESCRIPTION OF THE EXEMPLARY EMBODIMENTS

According to an exemplary embodiment of the invention, a lens control apparatus having a shot function for a lens apparatus having an extender can reliably reproduce a shooting angle of view at storing a shot.

Hereinafter, a lens control apparatus according to an exemplary embodiment of the invention is described in detail with reference to the accompanying drawings.

Figure 1:
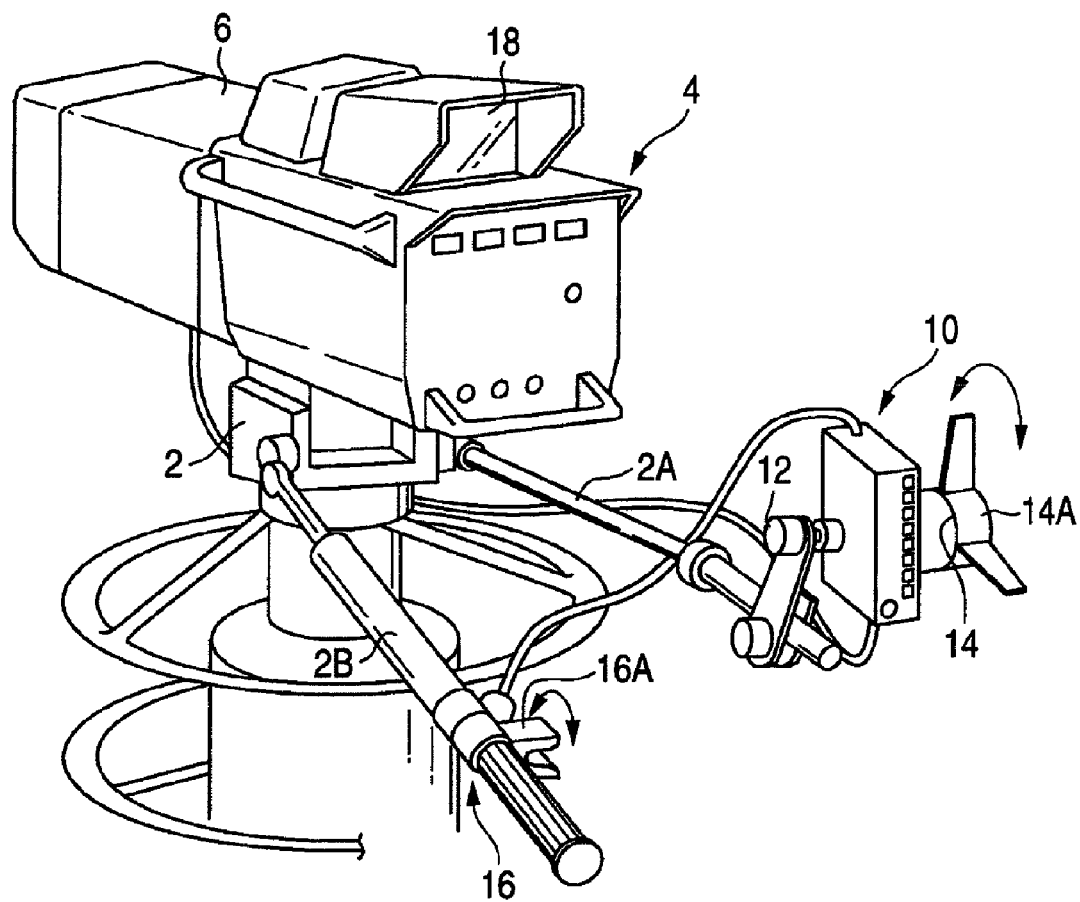
FIG. 1 is an external view of a television camera system using a shot box to which an exemplary embodiment of the invention is applied.

FIG. 1 is an external view of a television camera system using a shot box to which an exemplary embodiment of the invention is applied. As illustrated in FIG. 1, a servo operated type lens apparatus 6 is attached to a television camera 4 supported by a pan head 2. Two operating rods 2A and 2B are provided to extend from the pan head 2. A shot box 10 is attached to the vicinity of a grip of the operating rod 2A by a fixing knob 12.

A focus demand 14 for manually operating focus (focus lens group) of a shooting optical system of a lens apparatus 6 is provided integrally with the shot box 10. A focus control signal for instructing a movement position, to which the focus lens group of the lens apparatus 6 is moved, according to a rotation operation amount of a focus knob 14A is transmitted to the lens apparatus 6 via the shot box 10. The focus lens group of the lens apparatus 6 is driven based on the focus control signal. Thus, the position of a focus (i.e., a focal point) of the shooting optical system is changed.

An extender for converting a focal length of the shooting optical system is mounted in the lens apparatus 6. An operating switch (not shown) for instructing change of a magnification (referred to as an extender magnification in the present specification), at which the extender converts the focal length of the shooting optical system, is provided on the focus demand 14. An extender control signal for instructing change of the extender magnification in response to an operation of the operating switch is transmitted to the lens apparatus 6 via the shot box 10. The extender magnification set in the lens apparatus 6 is changed based on the extender control signal.

On the other hand, a zoom demand 16 for handling a zoom speed is attached to the vicinity of a grip of the operating rod 2B. A zoom control signal for instructing a speed, at which the zoom lens group of the lens apparatus 6 is moved to a wide-angle end or a telephoto end according to the direction and the amount of rotation of a zoom ring 16A, is transmitted from the zoom demand 16 to the lens apparatus 6 via the shot box 10. The zoom lens group of the lens apparatus 6 is driven based on the zoom control signal. Thus, the focal length of the shooting optical system is changed.

Figure 2:
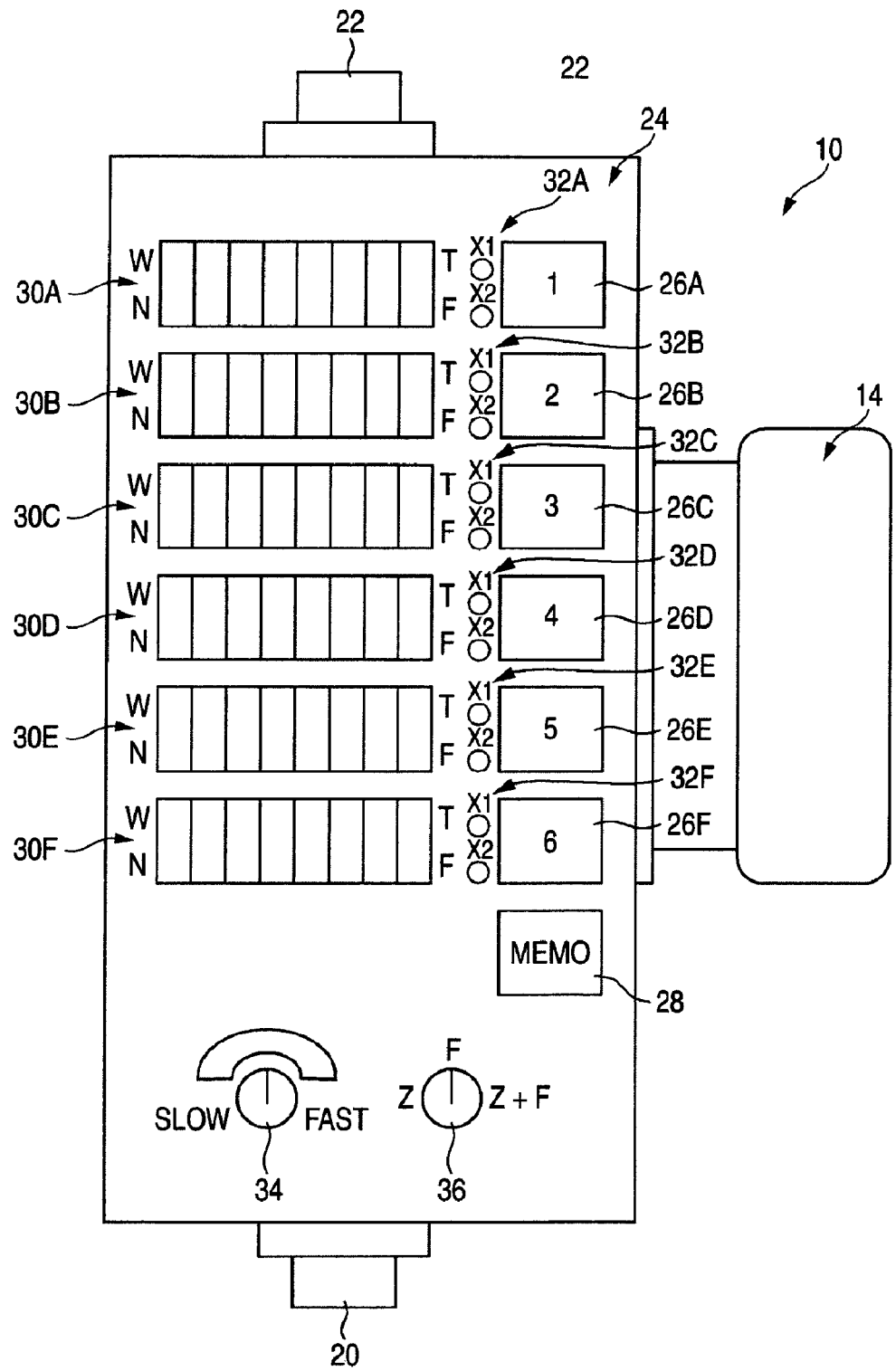
FIG. 2 is an external view of the shot box.

FIG. 2 is an external view of the shot box 10. As described above, the shot box 10 is provided integrally with the focus demand 14. A focus control signal based on an operation performed on the focus demand 14 is transmitted to the lens apparatus 6 via a cable from a lens connector 20 provided on the bottom surface of the shot box 10. A zoom demand connector 22, to which the zoom demand 16 is connected, is provided on the top surface of the shot box 10. A zoom control signal output from the zoom demand 16 is input to the shot box 10 from the zoom demand connector 22 via a cable. Then, the zoom control signal is transmitted to the lens apparatus 6 from the lens connector 20 provided on the bottom surface of the shot box 10.

An operation panel 24 on the front surface of the shot box 10 is provided with first to sixth shot switches 26A to 26F, a memo switch 28, indicators 30A to 30F, and 32A to 32F, a speed adjusting knob 34, and a reproduction mode selection switch 36. A light emitting diode (LED) for indicating an on-state/off-state by a turned-on-state/turned-off-state thereof is embedded in each of the switches 26A to 26F, and 28.

The shot switches 26A to 26F are used to instruct storage (registration) and reproduction of a shot concerning the zoom, the focus, and the extender. Six type "shots" can be stored and reproduced at the maximum using the six shot switches 26A to 26F. Although the apparatus can be adapted so that data concerning an iris is stored as a shot, and that the shot is reproduced, the storage and the reproduction of a shot concerning an iris is omitted in the description of the present embodiment.

The memo switch 28 serves to switch between a storage mode and a reproduction mode. These modes are switched from each other at every press of the memo switch 28. In an on-state in which the LED of the memo switch 28 is turned on (or blinks), the system is in the storage mode. When one of the shot switches 26A to 26F is pressed in the storage mode, data of a zoom position (the position of the zoom lens group), a focus position (the position of the focus lens group) and an extender magnification are stored in response to the pressed shot switch as information representing the set state of each of the zoom lens group, the focus lens group, and the extender at that time.

On the other hand, in an off-state in which the LED of the memo switch 28 is turned off, the system is in the reproduction mode. When one of the shot switches 26A to 26F, which corresponds to the stored shot, is pressed in the reproduction mode, the shot stored corresponding to the pressed shot switch is reproduced.

Further, in the reproduction mode, three kinds of modes, i.e., a "zoom reproduction mode", a "focus reproduction mode", and a "zoom-and-focus reproduction mode" can be selected by the reproduction mode selection switch 36. In the "zoom reproduction mode", only the zoom position and the extender magnification are reproduced from the shot, among the zoom position, the focus position, and the extender magnification represented by the stored shot (the focus position is not changed). According to this "zoom reproduction mode", only a focal length (shooting angle of view) at the time of storing the shot is reproduced.

In the "focus reproduction mode", only the focus position is reproduced from the shot, among the zoom position, the focus position, and the extender magnification represented by the stored shot. According to this "focus reproduction mode", only the focus position (the position of a point of focus) at the time of storing the shot is reproduced.

In the "zoom-and-focus reproduction mode", all the zoom position, the focus position, and the extender magnification represented by the stored shot are reproduced as the shot. According to this "zoom-and-focus reproduction mode", both of the focal length (shooting angle of view) and the focus position at the time of storing the shot are reproduced.

Incidentally, when the focus demand 14 and the zoom demand 16 are operated after the reproduction of the shot, the set state represented by the reproduced shot is canceled. Then, the focus, the zoom, and the extender of the lens apparatus 6 are controlled based on operations performed on the focus demand 14 and the zoom demand 16.

Pairs of each of the indicators 30A to 30F and an associated one of the switches 32A to 32F are provided corresponding to the shot switches 26A to 26F, respectively. Each of the pairs of the indicators indicates a shot stored corresponding to an associated one of the shot switches 26A to 26F. For example, each of the indicators 30A to 30F is configured to indicate one of zoom positions in a range from the wide-angle end to the telephoto end, and one of focus positions in a range from a near-point to an infinite end (far end) in terms of the positions of turned-on ones of a plurality of LEDs arranged laterally in line. In each of the indicators 30A to 30F, the LEDs, whose positions respectively correspond to an associated zoom position and an associated focus position represented by the stored shot, are turned on in different colors.

Each of the indicators 32A to 32F indicates an associated one of extender magnifications represented by the shots stored respectively corresponding to the shot switches 26A to 26F. For example, each of the indicators 32A to 32F is provided with a set of LEDs, which corresponds to one kind of switchable extender magnifications. Thus, the LEDs of the set corresponding to an extender magnification represented by the stored shot are turned on. In the present embodiment, magnifications of 1 and 2 can be selected as the switchable extender magnifications. Each of the indicators 32A to 32F is provided with two LEDs respectively used to indicate the magnifications of 1 and 2, respectively.

The speed adjusting knob 34 is used to set a reproduction speed at the reproduction of a shot. A movement speed, at which each of the zoom lens group and the focus lens group is moved to a position represented by the stored shot, is changed according to an adjustment position of the speed adjusting knob 34.

Figure 3:
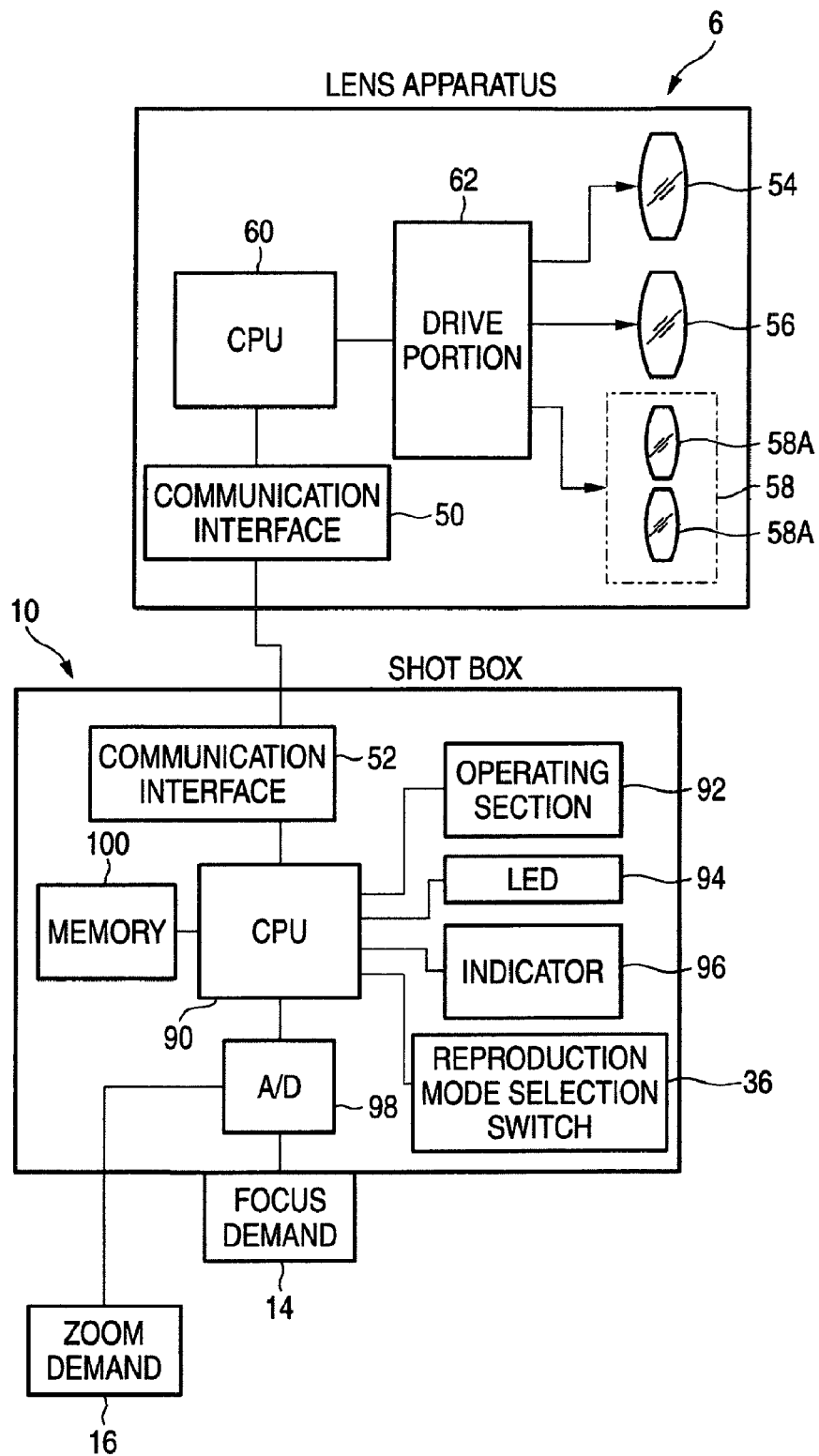
FIG. 3 is a block diagram illustrating a configuration of a lens apparatus and the shot box.

FIG. 3 is a block diagram illustrating the configuration of each of a lens apparatus 6 and the shot box 10. As illustrated in FIG. 3, the lens apparatus 6 and the shot box 10 are connected to each other by a cable provided between communication interfaces 50 and 52. Various signals are exchanged between the communication interfaces 50 and 52 by serial communication. The focus demand 14 and the zoom demand 16 are connected to the shot box 10. Control signals (a zoom control signal, a focus control signal, an extender control signal and the like) output from the focus demand 14 and the zoom demand 16 are transmitted to the lens apparatus 6 via the shot box 10.

In the lens apparatus 6, the zoom lens group 54 for changing the focal length continuously, the focus lens group 56 for adjusting a focal position (i.e., focusing), and the extender 58 for converting the focal length of the shooting optical system into a multiple thereof are disposed in a shooting optical system for forming an image of an object. The zoom lens group 54, the focus lens group 56, and the extender 58 are driven by a drive portion 62 that is connected thereto and includes a motor.

The extender 58 has a plurality of types of lens groups (extender lens groups) to be inserted into and detached from the shooting optical system. The present embodiment has an extender lens group 58A for obtaining the same focal length as that of the shooting optical system, and another extender lens group 58B for converting the focal length of the shooting optical system into a twofold focal length. Additionally, some extender has a lens group for converting the focal length into another multiple of, e.g., 0.8 thereof as another type of an extender lens group, in addition to the extender lens group for converting the focal length of the shooting optical system into a twofold focal length. Whatever type of the extender lens group of the extender 58 is (whatever multiple of the focal length into which the extender lens group converts that of the shooting optical system), the invention can be applied to apparatuses provided with the aforementioned extender 58.

A central processing unit (CPU) 60 is installed in the lens apparatus 6. The CPU 60 outputs drive signals for driving the zoom lens group 54, the focus lens group 56, and the extender 58 to the drive portion 62, based on the zoom control signal, the focus control signal, and the extender control signal provided to the CPU 60 from the shot box 10 via the communication interface 50. Consequently, the zoom lens group 54, the focus lens group 56, and the extender 58 are driven according to the control signals given from the shot box 10. Incidentally, the zoom control signal, the focus control signal, and the extender control signal output from the focus demand 14 and the zoom demand 16 are given to the CPU 60 via the shot box 10. At the reproduction of the shot, a control signal generated by the shot box 10 for reproducing the shot is given to the CPU 60.

Further, information representing current positions of the zoom lens group 54 and the focus lens group 56 and a current extender magnification of the extender 58 is given from a position sensor (not shown) to the CPU 60. At storage of a shot, information representing the presently set positions of the zoom lens group 54 and the focus lens group 56 and the presently set extender magnification of the extender 58 is transmitted therefrom to the shot box 10 via the communication interface 50.

A CPU 90 is installed in the shot box 10. The states of the shot switches 26A to 26F, the memo switch 28, the speed adjusting knob 34, and the reproduction mode selection switch 36 provided on the operation panel 24 of the shot box 10 illustrated in FIG. 2 are detected by the CPU 90. Then, shot storage processing and shot reproduction processing are performed according to the detected states. In FIG. 3, the shot switches 26A to 26F, the memo switch 28, and the speed adjusting knob 34 are not individually illustrated and are collectively shown by a block designated as an operating section 92.

Additionally, an LED indicating an on-state/off-state is provided in each of the shot switches 26A to 26F and the memo switch 28. The turn-on and the turn-off of each of these LEDs are controlled by the CPU 90. In FIG. 3, the LEDs provided in the switches are not individually shown and are collectively shown by a block designated as an LED 94.

Further, as illustrated in FIG. 2, at positions corresponding to each of the shot switches 26A to 26F, an associated one of the indicators 30A to 30F and that of the indicators 32A to 32F are respectively provided to indicate the shots stored corresponding to an associated one of the shot switches 26A to 26F. Such indications of the stored shots are controlled by the CPU 90. In FIG. 3, the indicators 30A to 30F and 32A to 32F are collectively shown by a block designated as an indicator 96.

When all of the shot switches 26A to 26F are in an off-state (the CPU 90 performs neither shot storage processing nor shot reproduction processing), the CPU 90 reads control signals (a zoom control signal and a focus control signal) output from the focus demand 14 and the zoom demand 16 via an analog-to-digital (A/D) converter 92. Then, the CPU 90 transmits the control signals to the lens apparatus 6 (the CPU 60) via the communication interface 52. On the other hand, at reproduction of a shot, a zoom control signal, a focus control signal, and an extender control signal output from the focus demand 14 and the zoom demand 16 are not transmitted to the lens apparatus 6. Control signals for reproduction of the shot are generated by the CPU 90 itself. Then, the generated control signals are transmitted by the CPU 90 to the lens apparatus 6.

Hereinafter, processing relating to a shot, which is performed by the CPU 90, is described. When a new shot is stored, an operator puts the memo switch 28 of the shot box 10 into an on-state. Then, the operator turns on one of the shot switches 26A to 26F, which corresponds to the shot to be stored. When the CPU 90 detects that the memo switch 28 is in an on-state, the CPU 90 performs processing to be executed in the storage mode. That is, first, it is detected whether one of the shot switches 26A to 26F is turned on. If one of the shot switches 26A to 26F is turned on, information representing a current zoom position, a current focus position, and a current extender magnification is acquired from the lens apparatus 6 by communication. The acquired information representing the zoom position, the focus position, and the extender magnification is stored in a memory 100 as a shot corresponding to the shot switch having been turned on. The zoom position, the focus position, and the extender magnification represented by the stored shot is indicated by one of the indicators 30A to 30F and 32A to 32F, which is provided at a position corresponding to the turned-on one of the indicators 30A to 30F and 32A to 32F.

On the other hand, in a case where a shot is reproduced, an operator puts the memo switch 28 of the shot box 10 into an off-state. Then, the operator turns on one of the shot switches 26A to 26F which corresponds to the stored shot to be reproduced. Further, before the shot switch is turned on, one of the modes, i.e., the "zoom reproduction mode", the "focus reproduction mode", and the "zoom-and-focus reproduction mode" is selected by the reproduction mode selection switch 36 according to whether an object to be reproduced is only the set state of zoom (a shooting angle of view), whether the object to be reproduced is only the set state of focus (a focus position), and whether the object to be reproduced is both of the set states of a zoom and a focus. The shot of only zoom (the zoom lens group 54 and the extender 58) is reproduced when the "zoom reproduction mode" is selected as described above, the shot of only of a focus (the focus lens group 56) is reproduced when the "focus reproduction mode" is selected, and the shot of both zoom (the zoom lens group 54 and the extender 58) and focus (the focus lens group 56) is reproduced when the "zoom-and-focus reproduction mode" is selected.

The CPU 90 performs reproduction mode processing when detecting that one of the shot switches 26A to 26F is turned on during the memo switch 28 is in an off-state. That is, first, data including a set position of the reproduction mode selection switch 36 is read. Then, it is detected which of the "zoom reproduction mode", the "focus reproduction mode" and the "zoom-and-focus reproduction mode" is selected.

Further, in a case where the "zoom reproduction mode" is selected, information including a zoom position and an extender magnification included in information of a shot stored corresponding to the turned-on shot switch is read from the memory 100. Then, a zoom control signal and an extender control signal for reproducing the zoom position and the extender magnification are transmitted to the lens apparatus 6. Consequently, the zoom position and the extender magnification represented by the shot stored corresponding to the turned-on shot switch are reproduced. That is, a focal length (shooting angle of view) at the time of storing the shot is reproduced. On the other hand, a focus position is not reproduced. The position of the zoom is maintained at a position corresponding to the turned-on switch.

In a case where the "focus reproduction mode" is selected, information representing a focus position included in information represented by the shot stored corresponding to the turned-on shot switch is read from the memory 100. Then, a focus control signal for reproducing the focus position is transmitted to the lens apparatus 6 by the CPU 90. Consequently, the focus position represented by the shot stored corresponding to the turned-on shot switch is reproduced. That is, the focus position at the time of storing the shot is reproduced. On the other hand, the zoom position and the extender magnification are not reproduced. The position of the focus is maintained at the position at the time of turning on the shot switch.

In a case where the "zoom-and-focus reproduction mode" is selected, all information including a zoom position, a focus position and an extender magnification included in information represented by the shot stored corresponding to the turned-on shot switch is read from the memory 100. Then, a zoom signal, a focus control signal, and an extender magnification for reproducing the zoom position, the focus position, and the extender magnification are transmitted to the lens apparatus 6 by the CPU 90. Consequently, the zoom position, the focus position, and the extender magnification represented by the shot stored corresponding to the turned-on shot switch are reproduced. That is, the focal length (the shooting angle of view) and the focus position at the time of storing the shot are reproduced.

As described above, in the foregoing description, the embodiment, in which the invention is applied to the shot box 10 constructed integrally with the focus demand 14, has been described. However, the invention can be applied to a given controller having a shot function, which is separated from the focus demand 14.

Further, the aforementioned embodiment is configured to store information on the extender magnification as information on the shot representing the set state of the extender 58 at the time of storing the shot. However, information to be stored as the information concerning the shot representing the set state of the extender 58 is not limited thereto. Another kind of Information representing the set state of the extender 58 can be stored as the information concerning the shot.

Furthermore, in the aforementioned embodiment, the three kinds of modes, i.e., the "zoom reproduction mode", the "focus reproduction mode", and the "zoom-and-focus reproduction mode" can be selected. However, an apparatus according to the invention can be configured to be able to select two of these modes.

What is claimed is:

1. A lens control apparatus for controlling a lens apparatus that comprises a shooting optical system including: a zoom lens group adapted to continuously change a focal length of the shooting optical system; and an extender adapted to convert the focal length of the shooting optical system at a magnification and to be able to change the magnification for conversion, the lens control apparatus comprising:

a shot control section adapted to preliminarily store data including an intended position of the zoom lens group as a shot, and to move the zoom lens group to the position stored as the shot when a shot reproduction operation of instructing a shot reproduction is performed, wherein the data stored as the shot further includes an intended set state of the extender, and when the shot reproduction operation is performed, the shot control section moves the zoom lens group to the position stored as the shot and sets the extender in the set state stored as the shot, the shooting optical system further includes a focus lens group adapted to adjust a focus position of the shooting optical system, and the data stored as the shot further includes an intended position of the focus lens group, and when the shot reproduction operation is performed, the shot controls section moves the zoom lens group and the focus lens group to the respective positions stores as the shot.

2. A lens control apparatus for controlling a lens apparatus that comprises a shooting optical system including: a zoom lens group adapted to continuously change a focal length of the shooting optical system; and an extender adapted to convert the focal length of the shooting optical system at a magnification and to be able to change the magnification for conversion, the lens control apparatus comprising:

a shot control section adapted to preliminarily store data including an intended position of the zoom lens group as a shot, and to move the zoom lens group to the position stored as the shot when a shot reproduction operation of instructing a shot reproduction is performed, wherein the data stored as the shot further includes an intended set state of the extender, and when the shot reproduction operation is performed, the shot control section moves the zoom lens group to the position stored as the shot and sets the extender in the set state stored as the shot, the shooting optical system further includes a focus lens group adapted to adjust a focus position of the shooting optical system, the data stored as the shot further includes an intended position of the focus lens group, the shot control section can perform control operations of at least two modes selected from the group consisting of:

a zoom-and-focus reproduction mode in which when the shot reproduction operation is performed, the shot control section moves the zoom lens group and the focus lens group to the respected positions stored as the shot and sets the extender in the set state stored as the shot;

a focus reproduction mode in which when the shot reproduction operation is performed, the shot control section moves only the focus lens group to the position stored as the shot; and a zoom reproduction mode in which when the shot reproduction operation is performed, the shot control section moves the zoom lens group to the position stored as the shot, sets the extender in the set state stored as the shot, and keeps the focus lens group at a position at a time when the shot reproduction operation is performed, and when the shot reproduction operation is performed, the shot control section performs a control operation of one mode selected by a selection section from the at least two modes.

* * * * *